(12) United States Patent
Hwang et al.

(10) Patent No.: US 9,099,691 B2
(45) Date of Patent: Aug. 4, 2015

(54) RECHARGEABLE BATTERY

(75) Inventors: Po-Jung Hwang, Yongin-si (KR);
Seung-Jae Lee, Yongin-si (KR);
Yoo-Myung Kang, Yongin-si (KR);
Jae-Do Ahn, Yongin-si (KR); Jae-Min Yang, Yongin-si (KR); Jeong-Heon Lee, Yongin-si (KR); Byeong-Yeol Song, Yongin-si (KR); Jae-Hyun Hwang, Yongin-si (KR); Sung-Soo Kim, Yongin-si (KR); Sae-Weon Roh, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 524 days.

(21) Appl. No.: 12/882,125

(22) Filed: Sep. 14, 2010

(65) Prior Publication Data

US 2011/0123857 A1    May 26, 2011

Related U.S. Application Data

(60) Provisional application No. 61/264,579, filed on Nov. 25, 2009.

(51) Int. Cl.
*H01M 2/26* (2006.01)
*H01M 2/30* (2006.01)
*H01M 2/02* (2006.01)
(Continued)

(52) U.S. Cl.
CPC .............. *H01M 2/0212* (2013.01); *H01M 2/26* (2013.01); *H01M 2/266* (2013.01); *H01M 4/70* (2013.01); *H01M 10/0413* (2013.01); *H01M 10/0463* (2013.01)

(58) Field of Classification Search
None
See application file for complete search history.

(56) References Cited

U.S. PATENT DOCUMENTS

| 5,674,641 A | 10/1997 | Cheu |
| 6,387,567 B1 | 5/2002 | Noh |

(Continued)

FOREIGN PATENT DOCUMENTS

| CN | 101080828 A | 11/2007 |
| JP | 11-045739 A | 2/1999 |

(Continued)

OTHER PUBLICATIONS

Patent Abstracts of Japan, and English machine translation of Japanese Publication 2000-040501, (12 pages).

(Continued)

*Primary Examiner* — Jonathan Crepeau
(74) *Attorney, Agent, or Firm* — Christie, Parker & Hale, LLP (57) ABSTRACT

A rechargeable battery includes an electrode assembly having a plurality of first electrodes each including a first coated region coated with a first active material and a first uncoated region having a first alignment opening and a second alignment opening, a plurality of second electrodes each including a second coated region coated with a second active material and a second uncoated region having a third alignment opening and a fourth alignment opening, a separator between each first coated region and each second coated region; and a case housing the electrode assembly, wherein the first alignment openings are substantially aligned with each other, the second alignment openings are substantially aligned with each other, the third alignment openings are substantially aligned with each other, and the fourth alignment openings are substantially aligned with each other.

4 Claims, 10 Drawing Sheets

(51) Int. Cl.
*H01M 4/70* (2006.01)
*H01M 10/04* (2006.01)

(56) References Cited

U.S. PATENT DOCUMENTS

| | | | |
|---|---|---|---|
| 6,680,146 B2 | 1/2004 | Fukuda et al. | |
| 7,964,302 B2 | 6/2011 | Ha et al. | |
| 2005/0164079 A1* | 7/2005 | Kim | 429/174 |
| 2007/0059592 A1* | 3/2007 | Takami et al. | 429/161 |
| 2009/0186269 A1* | 7/2009 | Kim et al. | 429/179 |
| 2012/0129037 A1* | 5/2012 | Hohenthanner et al. | 429/153 |

FOREIGN PATENT DOCUMENTS

| | | |
|---|---|---|
| JP | 2000-040501 | 2/2000 |
| JP | 2000-243374 | 9/2000 |
| JP | 2000-260478 | 9/2000 |
| JP | 2000-348773 | 12/2000 |
| JP | 2001-313068 | 11/2001 |
| JP | 2003-045474 | 2/2003 |
| JP | 2007-0250319 | 9/2007 |
| JP | 2008-108743 | 5/2008 |
| JP | 2008-524797 | 7/2008 |
| KR | 2007-0111217 | 11/2007 |
| WO | WO 95/16282 A1 | 6/1995 |
| WO | WO 2006/068379 A1 | 6/2006 |
| WO | WO 2007/126243 A1 | 11/2007 |
| WO | WO 2010/084026 * | 7/2010 |

OTHER PUBLICATIONS

Patent Abstracts of Japan, and English machine translation of Japanese Publication 2000-348773, (8 pages).
Patent Abstracts of Japan, and English machine translation of Japanese Publication 2003-045474, (7 pages).
EPO EESR issued on May 4, 2012 for EP Application No. 10252007.9 (6 pages).
Machine English Translation of JP 11-045739 A (17 pages).
Patent Abstracts of Japan, and English machine translation of Japanese publication 2000-243374, (7 pages).
Patent Abstracts of Japan, and English machine translation of Japanese publication 2000-260478, (16 pages).
SIPO Office action dated Nov. 15, 2013, with English translation, corresponding to Chinese Patent application 2010105278994, (14 pages).
EPO Office action dated Aug. 27, 2013, for corresponding European Patent application 10252007.9, (3 pages).
SIPO Office action dated Mar. 11, 2013, for corresponding Chinese Patent application 201010527899.4, with English translation, (14 pages).
SIPO Office action dated Jun. 6, 2014, with English translation, corresponding to Chinese Patent application 201010527899.4, (12 pages).
SIPO Office action dated Dec. 18, 2014, with English translation, for corresponding Chinese Patent application 201010527899.4, (14 pages).

* cited by examiner

RECHARGEABLE BATTERY

CROSS-REFERENCE TO RELATED APPLICATION

This application claims priority to and the benefit of provisional Patent Application No. 61/264,579 filed Nov. 25, 2009, the entire content of which is incorporated herein by reference.

BACKGROUND OF THE INVENTION (a) Field of the Invention
This disclosure relates to a rechargeable battery.
(b) Description of the Related Art
A rechargeable battery can be discharged and recharged, unlike a primary battery that cannot be recharged. A low capacity rechargeable battery is often used for a small portable electronic device such as a mobile phone or a laptop computer, while a large capacity rechargeable battery is often used as a power storage source or an electrical source for driving a motor such as for an electric vehicle, a hybrid vehicle, and the like.

A rechargeable battery typically includes an electrode assembly including a positive electrode and a negative electrode, and a separator interposed between the positive and negative electrodes, a case housing the electrode assembly, and electrode terminals that are electrically connected with the electrode assembly and which protrude from the case. The electrode assembly often includes several positive and negative electrodes and separators which are wound into a jellyroll, folded in a zigzag way, or stacked in several layers.

In the electrode assembly, positive and negative terminals are respectively fixed by welding or the like on positive and negative uncoated regions exposed from the separator.

This aforementioned rechargeable battery may have various output performances, cycle-lives, reliability, and the like depending on arrangement and current collecting structure of an electrode assembly. For example, when positive and negative electrodes and a separator are not properly aligned in an electrode assembly, the electrode assembly may cause the rechargeable battery to become defective or short circuit during a subsequent process such as welding or assembly.

The above information disclosed in this Background section is only for enhancement of understanding of the background of the described technology and therefore it may contain information that does not form the prior art that is already known in this country to a person of ordinary skill in the art.

SUMMARY OF THE INVENTION

An exemplary embodiment provides a rechargeable battery including an electrode assembly in which positive and negative electrodes are aligned and thus, having improved output performance, cycle-life, and reliability by increasing current collecting efficiency of each positive and negative electrode.

According to aspects of the present invention, a rechargeable battery is provided including an electrode assembly having a plurality of first electrodes each including a first coated region coated with a first active material and a first uncoated region having a first alignment opening and a second alignment opening, a plurality of second electrodes each including a second coated region coated with a second active material and a second uncoated region having a third alignment opening and a fourth alignment opening, a separator between each first coated region and each second coated region; and a case housing the electrode assembly, wherein the first alignment openings are substantially aligned with each other, the second alignment openings are substantially aligned with each other, the third alignment openings are substantially aligned with each other, and the fourth alignment openings are substantially aligned with each other.

In one embodiment, the first alignment opening is on a first half of the first uncoated region and the second alignment opening is on a second half of the first uncoated region, and wherein the third alignment opening is on a first half of the second uncoated region and the fourth alignment opening is on a second half of the second uncoated region.

Further, the rechargeable battery may also include a first terminal and a second terminal, wherein the first terminal extends in a first direction from the electrode assembly and wherein the second terminal extends in a second direction from the electrode assembly substantially opposite to the first direction. In one embodiment the electrode assembly is laminated.

The rechargeable battery may also include at least one cap plate sealing the case, a first current collecting plate electrically connected to the electrode assembly and having a first connection opening and a second connection opening, and a second current collecting plate electrically connected to the electrode assembly and having a third connection opening and a fourth connection opening. Additionally, a plurality of fasteners may be inserted through a respective one of the alignment openings and a respective one of the connection openings.

In one embodiment, a distance between the first alignment opening and the second alignment opening is different from a distance between the third alignment opening and the fourth alignment opening.

According to another aspect of the present invention, a rechargeable battery is provided including an electrode assembly having a first electrode including a first coated region coated with a first active material and a first uncoated region having a plurality of first alignment openings and a plurality of second alignment openings, a second electrode including a second coated region coated with a second active material and a second uncoated region having a plurality of third alignment openings and a plurality of fourth alignment openings, a first separator between the first coated region and the second coated region; a second separator forming an exterior layer of the electrode assembly and a case housing the electrode assembly, wherein all of the first alignment openings are substantially aligned with each other, all of the second alignment openings are substantially aligned with each other, all of the third alignment openings are substantially aligned with each other, and all of the fourth alignment openings are substantially aligned with each other. In one embodiment, the electrode assembly is folded or wound.

DETAILED DESCRIPTION

This disclosure will describe embodiments more fully hereinafter with reference to the accompanying drawings. As those skilled in the art would realize, the described embodiments may be modified in various different ways, all without departing from the spirit or scope of this disclosure.

Figure 1:
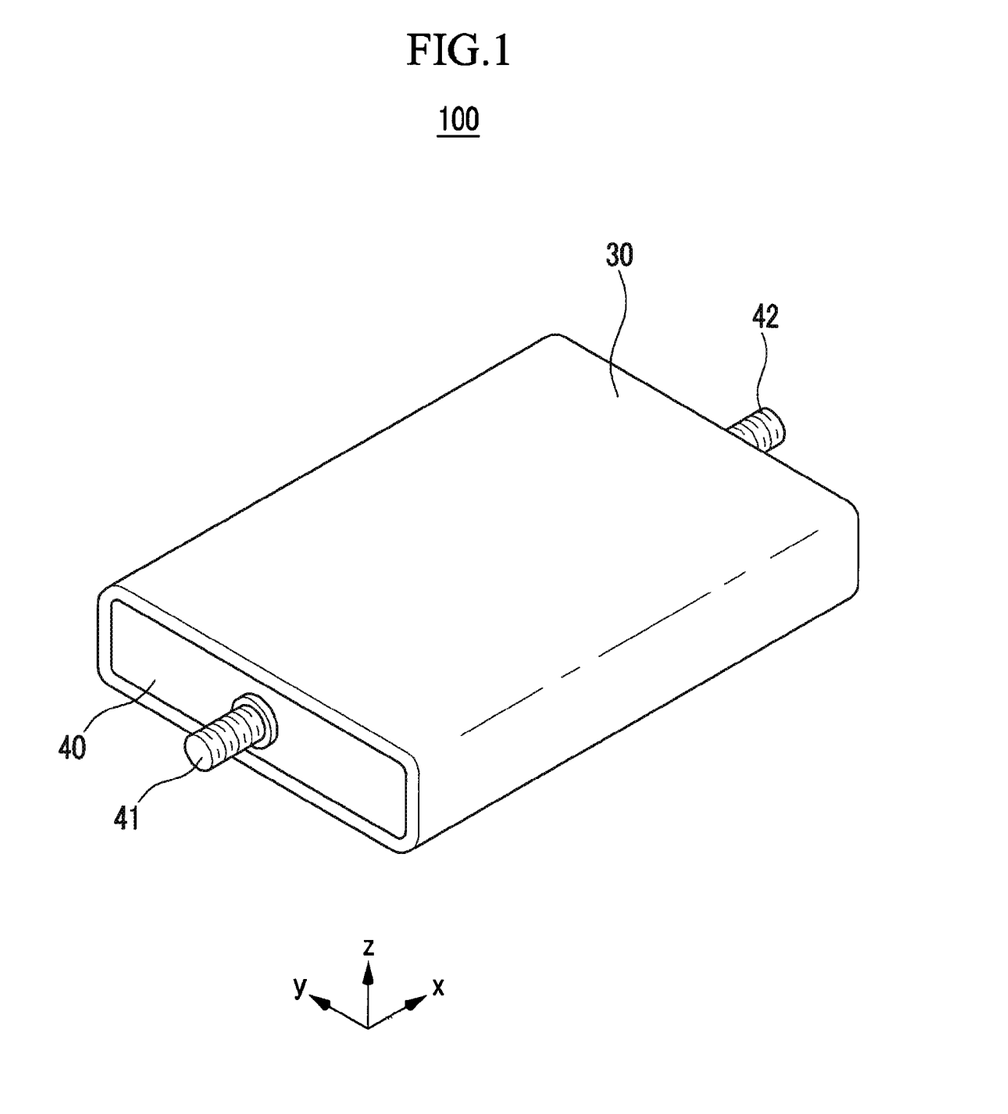
FIG. 1 is a perspective view of a rechargeable battery according to a first embodiment of the present invention.
Figure 2:
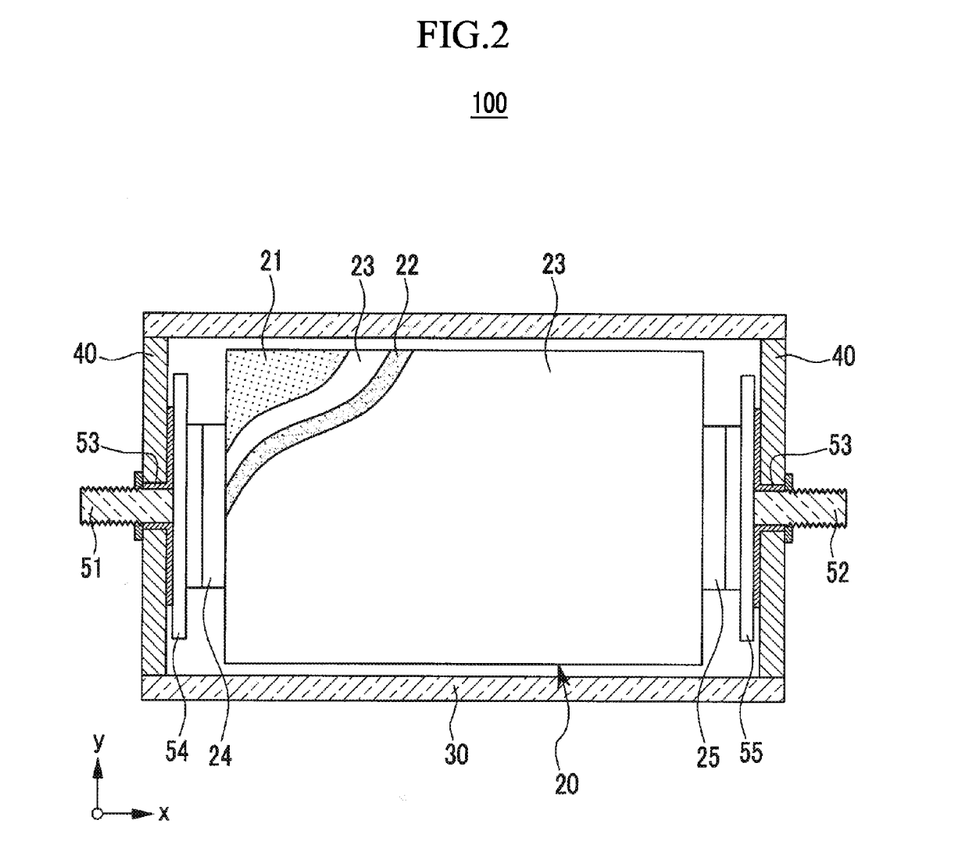
FIG. 2 is a cross-sectional view of the rechargeable battery shown in FIG. 1.

FIG. 1 is a perspective view of a rechargeable battery according to a first embodiment of the present invention, and FIG. 2 is a cross-sectional view of a rechargeable battery shown in FIG. 1.

Referring to FIGS. 1 and 2, a rechargeable battery 100 includes an electrode assembly 20 including a positive electrode 21, a negative electrode 22, and a separator 23, a case 30 having opposing open ends and housing the electrode assembly 20, a cap plate 40 connected to either open end of the case 30 and closing and sealing the case 30, and positive terminal 51 and negative terminal 52 mounted on the cap plate 40 and electrically connected to the electrode assembly 20.

Figure 3:
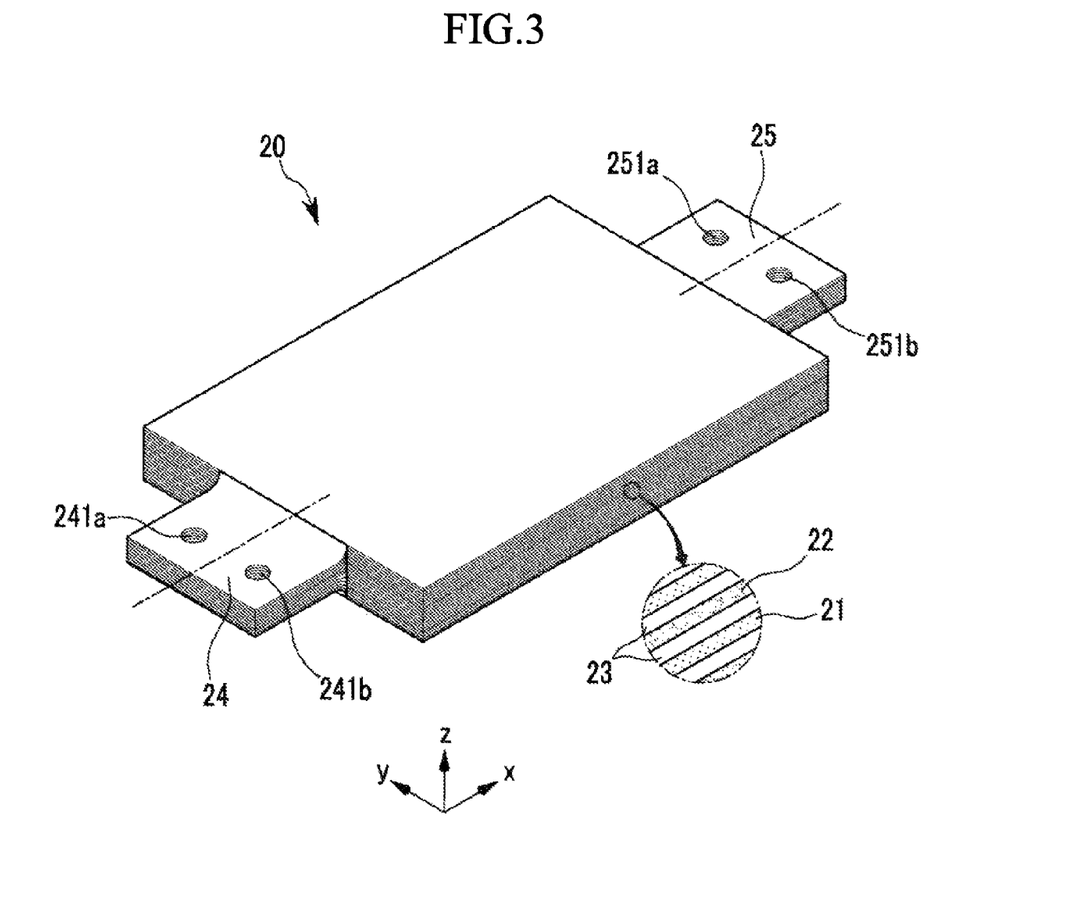
FIG. 3 is a perspective view of an electrode assembly of the rechargeable battery shown in FIG. 2.
Figure 4:
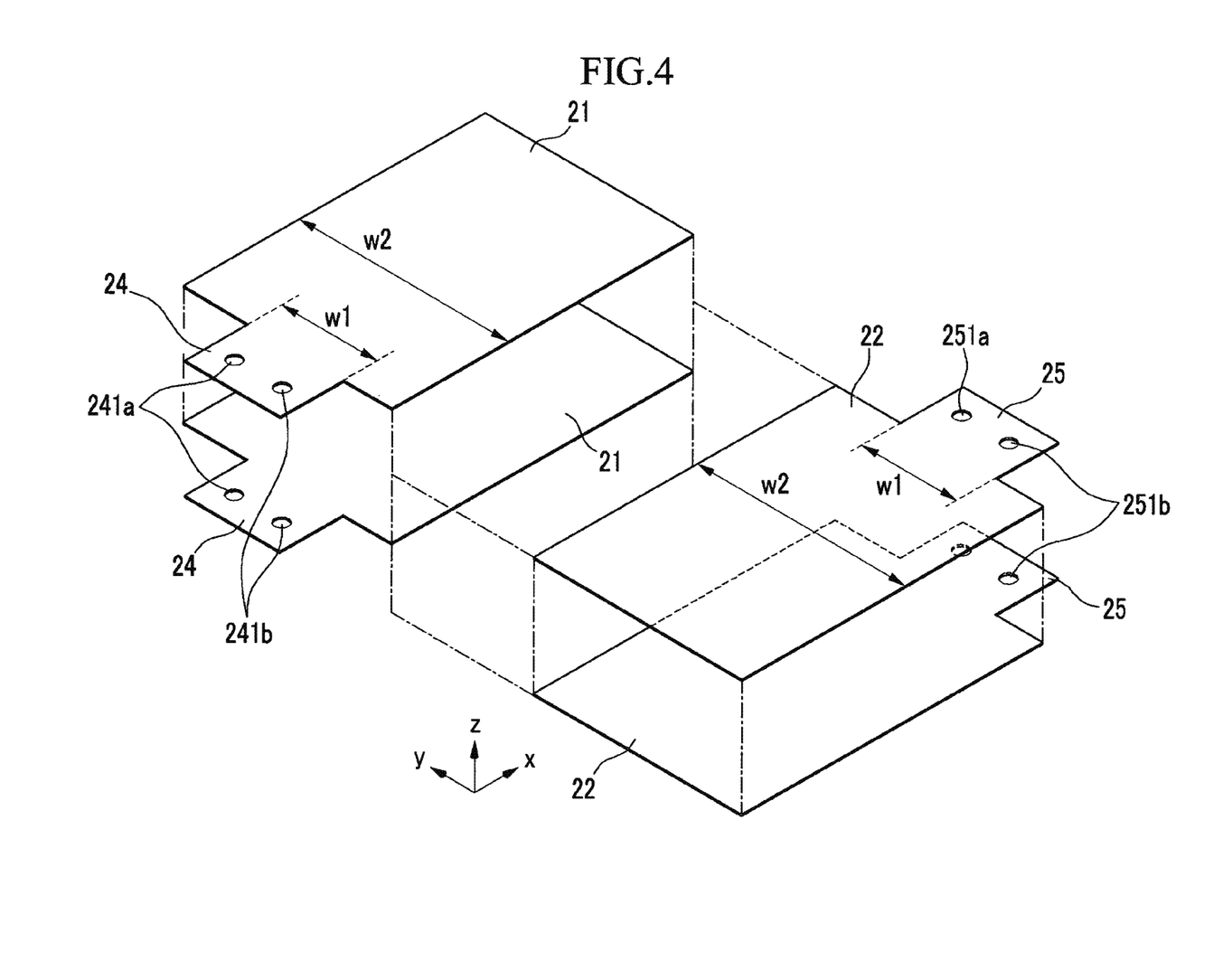
FIG. 4 is a perspective view of parts of positive and negative electrodes of the electrode assembly shown in FIG. 3.

FIG. 3 is a perspective view of an electrode assembly of the rechargeable battery shown in FIG. 2, and FIG. 4 is a perspective view of parts of positive and negative electrodes of the electrode assembly shown in FIG. 3.

Referring to FIGS. 3 and 4, the electrode assembly 20 is fabricated by respectively inserting a separator 23 between positive electrodes 21 and negative electrodes 22 and then laminating them together. The positive electrode 21 is prepared by coating a positive active material on both sides of a positive current collector, while a negative electrode 22 is prepared by coating a negative active material on both sides of a negative current collector.

Herein, the positive electrode 21 includes a positive uncoated region 24 extending from the separator 23, while the negative electrode 22 includes a negative uncoated region 25 extending from the separator 23. The positive and negative uncoated regions 24 and 25 are regions that are not coated with any active materials. The positive and negative uncoated region 24 and 25 extend in generally opposite directions from the electrode assembly 20.

The electrode assembly 20 has a generally rectangular prism shape. Based on the drawing, the x axis is designated as the length direction of an electrode assembly 20, while the y axis is designated as the width direction of the electrode assembly 20. The positive and negative uncoated regions 24 and 25 are on opposite ends of the electrode assembly 20 along the length direction (x axis) of the electrode assembly 20 (FIGS. 3 and 4), but may also be on opposites ends of the electrode assembly along the width direction (y axis) thereof.

The 'length direction' and 'width direction' of the electrode assembly 20 are defined based on the location of the positive and negative uncoated regions 24 and 25 as shown in FIGS. 3 and 4. In other words, when positive and negative uncoated regions 24 and 25 face each other along the width direction (y axis) of an electrode assembly 20, the 'length direction' of the electrode assembly 20 as shown in FIGS. 3 and 4 is understood as a 'width direction,' while the 'width direction' is understood as a 'length direction'.

There are as many positive uncoated regions 24 laminated together as there are positive electrodes 21. The laminated positive uncoated regions 24 each include at least two openings 241a, 241b relatively close to each other. Likewise, there are as many negative uncoated regions 25 laminated together as there are negative electrodes 22. The laminated negative uncoated regions 25 each include at least two openings 251a, 251b relatively close to each other. These openings 241a, 241b, 251a and 251b are formed in the positive and negative uncoated regions 24 and 25, respectively, before the lamination. In the figure, the positive and negative uncoated regions 24 and 25 each include two circular openings 241a, 241b and 251a, 251b.

Accordingly, when several positive and negative electrodes 21 and 22 and separators 23 are laminated into an electrode assembly 20, openings 241a, 241b and 251a, 251b arranged along the thickness direction (z axis) of the electrode assembly 20 show how positive and negative electrodes 21 and 22 are substantially aligned.

Herein, each of the two openings 241a, 241b in the positive uncoated region 24 are disposed on one half divided by along an imaginary line crossing the electrode assembly 20 parallel to the length direction (x axis) (marked as a chain line in FIG. 3). Similarly, each of the two openings 251a, 251b on the negative uncoated region 25 are disposed on either side of an imaginary line dividing the negative uncoated region in half. The two openings 241a, 241b and 251a, 251b on the positive and negative uncoated regions 24 and 25 may have the same pitch or size. Additionally, a distance between the first and second openings 241a, 241b may be the same or different than a distance between the third and fourth openings 251a, 251b.

Since the two openings 241a, 241b and 251a, 251b are formed on either side of a center line of a respective uncoated region, they can be identified when they are not aligned along the width direction (y axis) and the length direction (x axis) of an electrode assembly 20 during the lamination. In other words, if only one opening is provided and located on the center line or if the two openings are formed on only one side of the uncoated region, it may be difficult to determine misalignment of the positive and negative electrodes along the width and length directions of an electrode assembly 20.

In FIGS. 3 and 4, two openings 241a, 241b and 251a, 251b are formed on either side of a center line, but the number of openings is not limited thereto.

According to the first embodiment of the present invention, since the rechargeable battery 100 includes an electrode assembly 20 including several positive and negative electrodes 21 and 22 substantially aligned with one another, the electrode assembly may have less deformation in subsequent processes after the lamination. As a result, the rechargeable battery 100 may have a longer cycle-life characteristic and greater reliability.

The laminated positive uncoated regions 24 are closely attached to one another and bonded together by welding and the like. The laminated negative uncoated regions 25 are also closely attached to one another and bonded together by welding and the like.

Herein, the positive and negative uncoated regions 24 and 25 may have a smaller width than the positive and negative electrodes 21 and 22. In FIG. 4, the widths of the positive and negative uncoated regions 24 and 25 are marked as W1, while the widths of the positive and negative electrodes 21 and 22 are marked as W2. As such, distortion of the electrode assembly 20 can be prevented or significantly reduced when the positive and negative uncoated regions 24 and 25 are closely attached and bonded together.

Referring to FIGS. 1 and 2 again, the electrode assembly 20 is disposed in the case 30 with the positive uncoated region 24 toward one end of the case 30 and the negative uncoated region 25 toward the other end of the case 30. Then, a cap plate 40 including a positive terminal 51 is combined with one end of the case 30, while another cap plate 40 including a negative terminal 52 is combined with the other end of the case 30.

The positive and negative terminals 51 and 52 are mounted on the cap plate 40 with an insulating gasket 53 therebetween. A positive current collecting plate 54 connected to a positive terminal 51 and a negative current collecting plate 55 connected to a negative terminal 52 are mounted within the cap plate 40 toward the electrode assembly 20.

The positive uncoated region 24 is fixed to the positive current collecting plate 54 by welding and the like, while the negative uncoated region 25 is similarly fixed to the negative current collecting plate 55. Accordingly, the positive terminal 51 is electrically connected to the positive electrode 21, while the negative terminal 52 is electrically connected to the negative electrode 22.

Although the drawing shows that positive and negative terminals 51 and 52 extend in generally opposite directions, it will be appreciated that positive and negative terminals can be disposed parallel to each other and electrically connected to a single cap plate.

Figure 5:
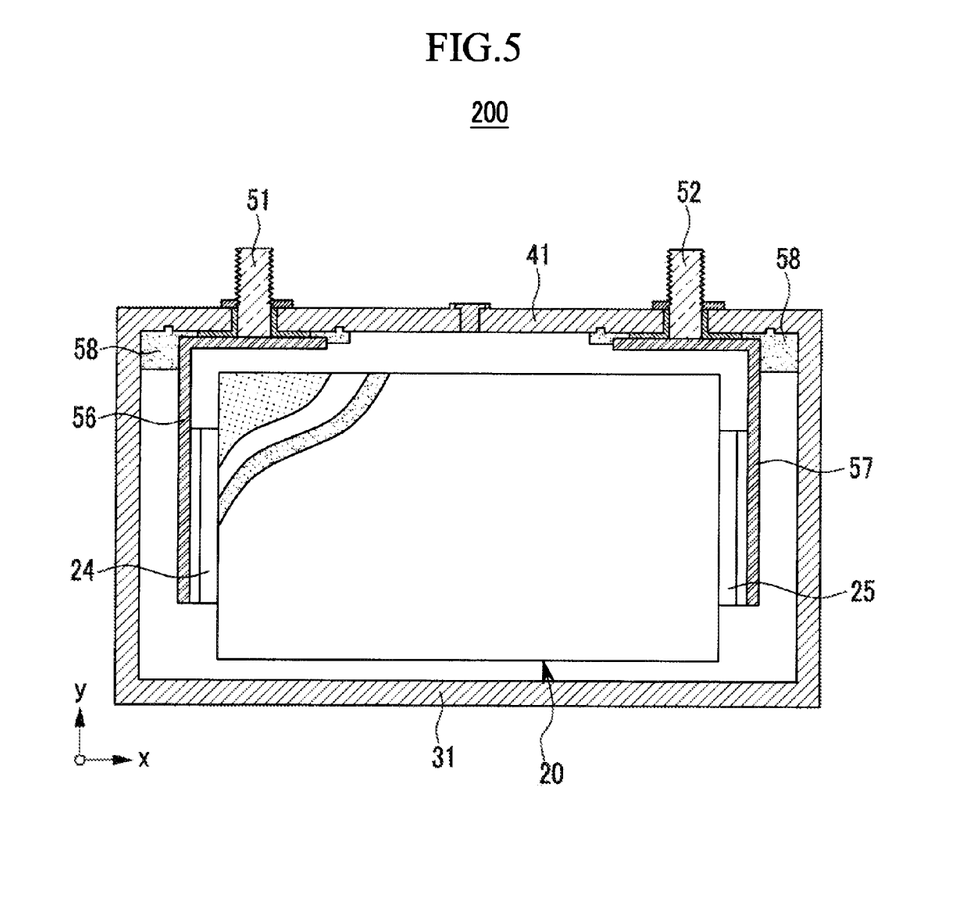
FIG. 5 is a cross-sectional view of a rechargeable battery according to a second embodiment of the present invention.

FIG. 5 is a cross-sectional view of a rechargeable battery according to a second embodiment of the present invention.

Referring to FIG. 5, a rechargeable battery 200 according to a second embodiment includes a case 31 having one open end and a cap plate 41 including positive and negative terminals 51 and 52 and connected to the open end. A bent positive current collecting plate 56 is disposed between and electrically connects the positive terminals 51 and the positive uncoated region 24 and a bent negative current collecting plate 57 is disposed between and electrically connects the negative terminal 52 and the negative uncoated region 25.

The positive uncoated region 24 is fixed to the positive current collecting plate 56 by welding or the like, while the negative uncoated region 25 is similarly fixed to the negative current collecting plate 57. An insulting member 58 is disposed between the cap plate 41 and the positive current collecting plate 56 and also between the cap plate 41 and the negative current collecting plate 57. The electrode assembly 20 has substantially the same composition as one of the first embodiment of the present invention.

Figure 6:
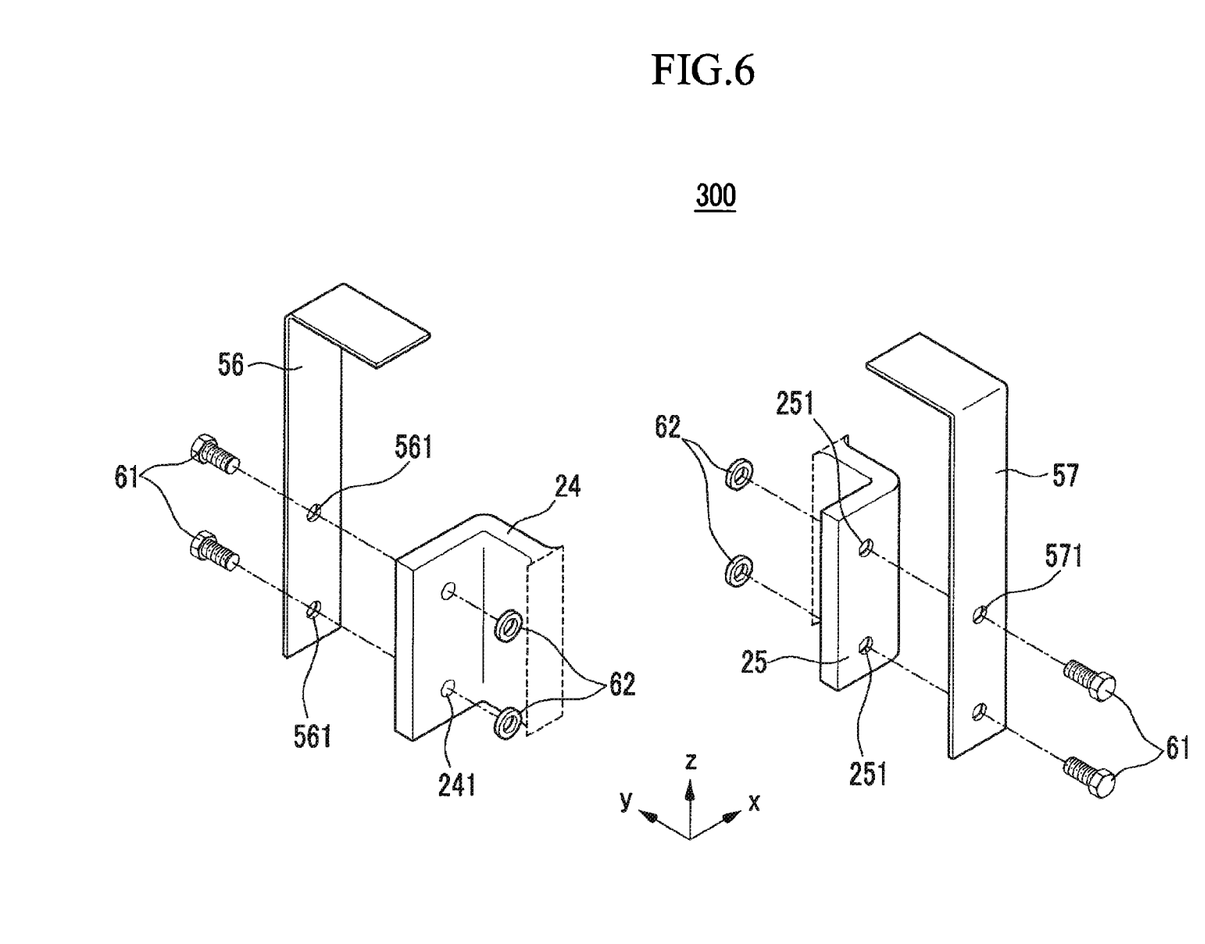
FIG. 6 is an exploded perspective view showing a positive uncoated region, a positive current collecting plate, a negative uncoated region, and a negative current collecting plate of a rechargeable battery according to a third embodiment of the present invention.

FIG. 6 is an exploded perspective view showing a positive uncoated region, a positive current collecting plate, a negative uncoated region, and a negative current collecting plate of a rechargeable battery according to a third embodiment of the present invention.

Referring to FIG. 6, the rechargeable battery 300 according to a third embodiment of the present invention includes openings 241a, 241b and 251a, 251b, respectively in the positive and negative uncoated regions 24 and 25, which are used as fastening holes for being mechanically combined with positive and negative current collecting plates 56 and 57. In other words, according to the third embodiment, a fastening member such as a bolt-nut assembly or a rivet may be used instead of welding, connecting a positive uncoated region 24 with a positive current collecting plate 56 and a negative uncoated region 25 with a negative current collecting plate 57.

Accordingly, openings 561a, 561b and 571a, 571b on respective positive and negative current collecting plates 56 and 57 are formed to correspond to openings 241a, 241b and 251a, 251b on positive and negative uncoated regions 24 and 25. In case of the bold-nut assembly, a bolt 61 is put through a positive current collecting plate 56 and a positive uncoated region 24 and then, tightened and fixed with a nut 62. The rivet may be heated and put through a positive current collecting plate and a positive uncoated region. Further, an end of the rivet may be modified by an external source to be fixed and prevent it from becoming detached. FIG. 6 shows assembly of a bolt 61 and a nut 62 as an example of the fastening member.

In the rechargeable battery 300 according to the third embodiment, openings 241a, 241b and 251a, 251b can be used to determine how well the electrode assembly 20 is aligned and also to facilitate mechanical combination of a positive uncoated region 24 with a positive current collecting plate 56 and also, a negative uncoated region 25 with a negative current collecting plate 57.

According to the first to third embodiments of the present invention, cases 30 and 31 are made of aluminum, aluminum alloy, or a conductive metal plated with nickel and has a shape corresponding to the electrode assembly 20.

Figure 7:
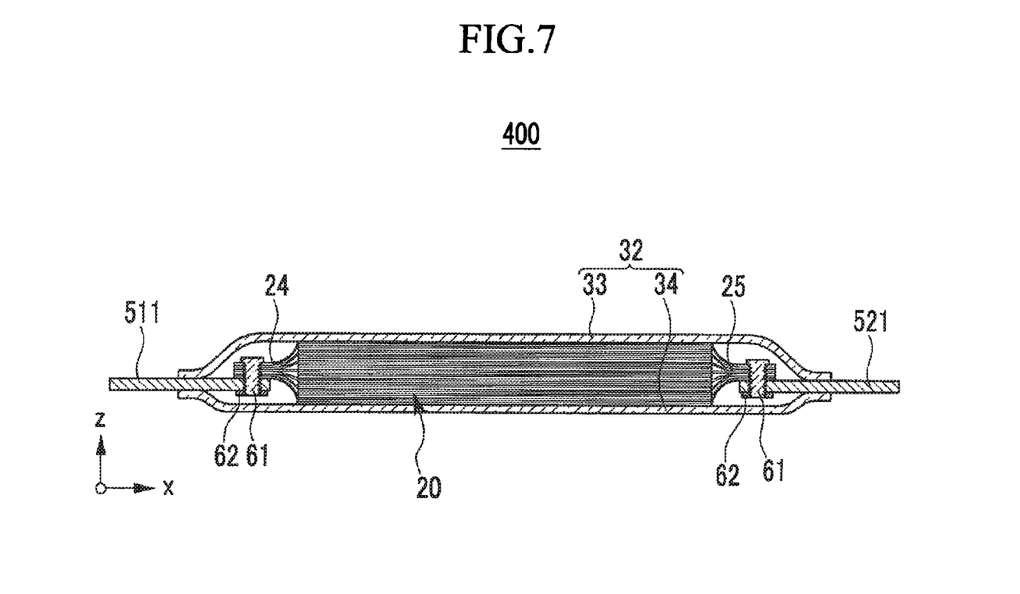
FIG. 7 is a cross-sectional view of a rechargeable battery according to a fourth embodiment of the present invention.

FIG. 7 is a cross-sectional view of a rechargeable battery according to a fourth embodiment of the present invention.

Referring to FIG. 7, a rechargeable battery 400 includes a case 32 made of a laminate sheet and positive and negative terminals 511 and 521 directly fixed with positive and negative uncoated regions 24 and 25 and extending from the case 32. The case 32 includes an upper case 33 and a lower case 34. According to a fourth embodiment of the present invention, the rechargeable battery 400 does not include a cap plate unlike the aforementioned exemplary embodiments.

The laminate sheet includes a metal layer and a resin layer united by an adhesive layer. The upper and lower cases 33 and 34 house the electrode assembly 20 impregnated in an electrolyte solution and they are sealed along their edges by thermal coalescence.

The positive and negative terminals 511 and 521 are shaped into a plate with a predetermined thickness and may include a sealing region formed by an insulating polymer on the region where the upper and lower cases 33 and 34 overlap. The sealing region insulates positive and negative terminals 511 and 521 from the case 32 and protects the positive and negative terminals 511 and 521 during the thermal coalescent treatment.

The positive and negative terminals 511 and 521 may also have an opening and can be attached to positive and negative uncoated regions 24 and 25 by a fastening member such as a bolt-nut assembly or a rivet. FIG. 7 shows the fastening member assembly example of a bolt 61 and a nut 62. On the other hand, a positive uncoated region 24 can be welded with a positive terminal 511 without a fastening member, while a negative uncoated region 25 can be welded with a negative terminal 521.

Figure 8:
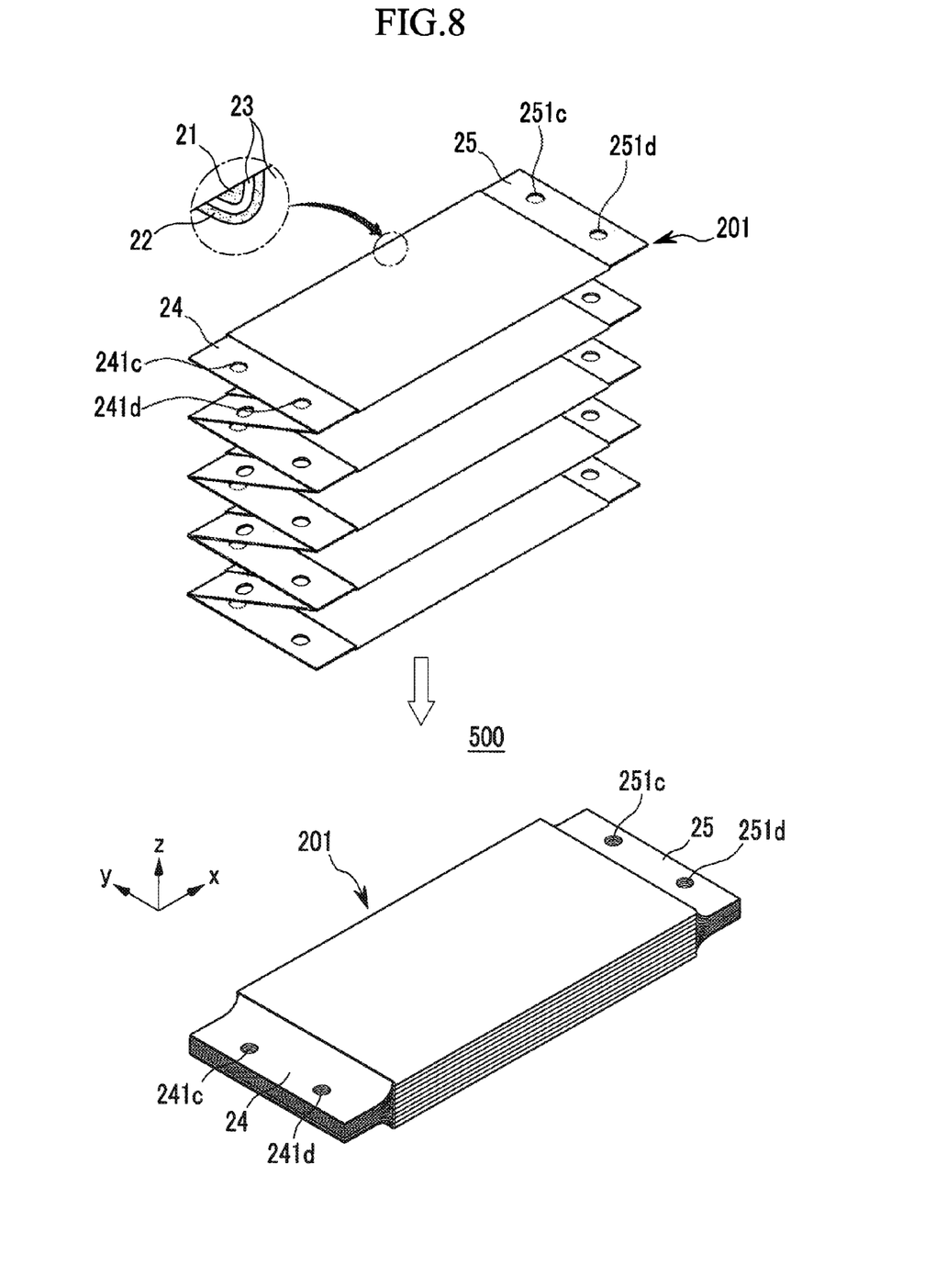
FIG. 8 is a schematic diagram of the electrode assembly of a rechargeable battery according to a fifth embodiment of the present invention.

FIG. 8 is a schematic diagram of the electrode assembly of a rechargeable battery according to a fifth embodiment of the present invention.

Referring to FIG. 8, a rechargeable battery 500 according to the fifth embodiment may include substantially the same components as a rechargeable battery according to one of the first to fourth embodiments except that the electrode assembly 201 is folded in a zigzag way and laminated.

The electrode assembly 201 may include one sheet of a positive electrode 21, one sheet of a negative electrode 22, one sheet of a separator 23 disposed therebetween, and another sheet of a separator 23 disposed outside of either of the positive and negative electrodes 21 and 22 to generally form an exterior of the electrode assembly. The positive and negative electrodes 21 and 22 and separators 23 are folded several times in a length direction, forming the electrode assembly 201.

Positive and negative uncoated regions 24 and 25 extending from the separator 23 may have a plurality of openings 241c, 241d and 251c, 251d. These openings 241c, 241d and 251c, 251d are formed in the positive and negative uncoated regions 24 and 25 and aid in alignment of the electrode assembly 201 in a thickness direction (z axis) when the electrode assembly 201 is folded and laminated. More specifically, the openings 241c, 241d and 251c, 251d may be aligned with each other to allow for alignment of the folded electrode assembly 201.

The laminated positive and negative uncoated regions 24 and 25 may be cut at both edges to have a shorter width and then united together by welding or the like.

Figure 9:
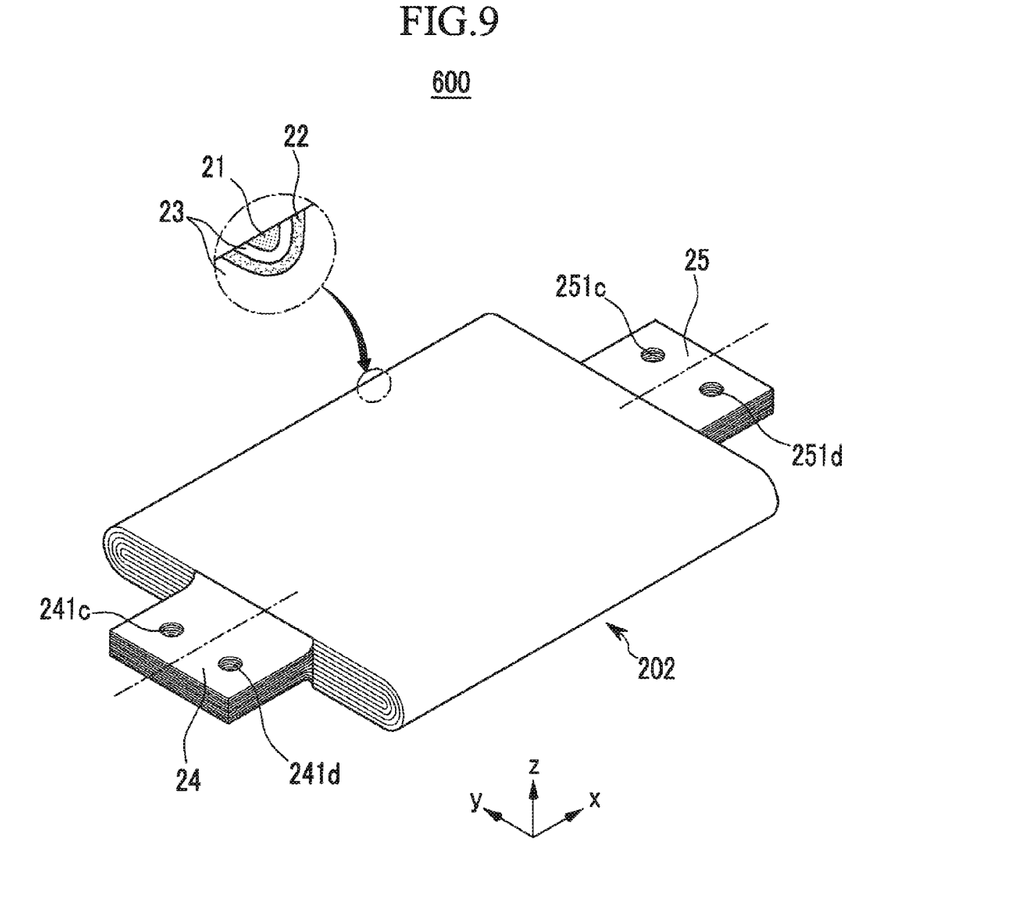
FIG. 9 is a perspective view of the electrode assembly of a rechargeable battery according to a sixth embodiment of the present invention.

FIG. 9 is a perspective view of the electrode assembly of a rechargeable battery according to a sixth embodiment of the present invention.

Referring to FIG. 9, a rechargeable battery 600 according to the sixth embodiment may include substantially the same components as the rechargeable batteries according to the first to the fourth embodiments except that the electrode assembly 202 is wound into a jelly-roll.

The electrode assembly 202 includes one sheet of a positive electrode 21, one sheet of a negative electrode 22, one sheet of a separator 23 disposed therebetween, and another sheet of a separator 23 disposed outside of either of the positive and negative electrodes 21 and 22 to form an exterior of the electrode assembly. The positive and negative electrodes 21 and 22 and the separator 23 are wound several times and pressed, forming the electrode assembly 202.

Positive and negative uncoated regions 24 and 25 extend from the separator 23 and have a plurality of openings 241c, 241d and 251c, 251d. These openings 241c, 241d and 251c, 251d are formed on the positive negative uncoated regions 24 and 25 and are adapted to be aligned along a thickness direction (z axis) when the electrode assembly 202 is wound, thus aiding in alignment of the electrode assembly 202.

However, in a spiral-wound electrode assembly 202, the openings 241c, 241d and 251c, 251d may not be aligned along the thickness direction due to, for example, thickness of positive and negative electrodes 21 and 22 and a separator 23, curvature of the positive and negative electrodes 21 and 22 and the separator 23 when they are rolled, and other various process deviations that may occur during the winding.

In this case, electrode assembly 202 can be evaluated based on an allowance by measuring location deviation of the openings 241c, 241d and 251c, 251d using an optical device or other similar device after setting an allowance along the thickness direction (z axis) regarding the location deviation of the openings 241c, 241d and 251c, 251d.

Figure 10:
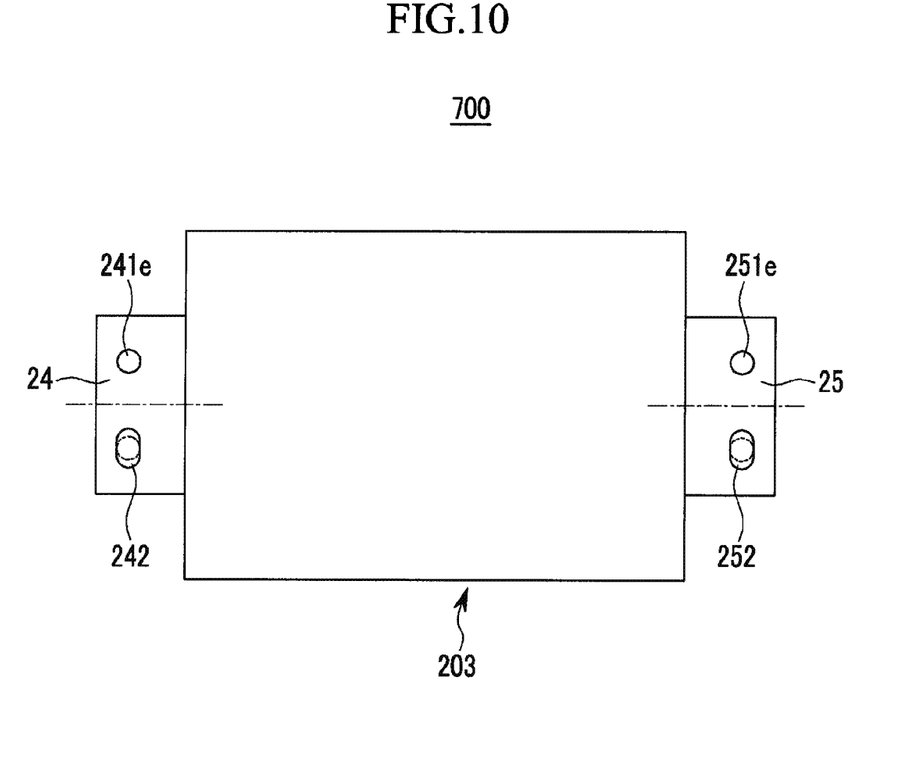
FIG. 10 is a front view of the electrode assembly of a rechargeable battery according to a seventh embodiment of the present invention.

FIG. 10 is a front view of the electrode assembly of a rechargeable battery according to seventh embodiment of the present invention.

Referring to FIG. 10, a rechargeable battery 700 according to the seventh embodiment may comprise substantially the same components as the rechargeable batteries according to the first to the sixth embodiments except that positive and negative uncoated regions 24 and 25 of the electrode assembly 203 have first circular openings 241e, 251e and second non-circular openings 242 and 252.

The second openings 242 and 252 are formed to have a generally ovular shape to provide an extra space on either side of an imaginary circular opening (marked as a dotted line).

Then, when a fastening member is inserted into the first openings 241e and 251e and the second openings 242 and 252, it may be easily fixed with positive and negative uncoated regions 24 and 25 despite some process error between a fastening member for the first openings 241e and 251e and another fastening member for the second openings 242 and 252.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed:
1. A rechargeable battery comprising:
an electrode assembly comprising:
a plurality of first electrodes each including a first coated region coated with a first active material and a first uncoated region having a first alignment opening and a second alignment opening,
a plurality of second electrodes each including a second coated region coated with a second active material and a second uncoated region having a third alignment opening and a fourth alignment opening,
a separator between each first coated region and each second coated region;
a case housing the electrode assembly, the case comprising a cap plate;
a first terminal and a second terminal, wherein the first terminal extends in a first direction from the electrode assembly and wherein the second terminal extends in a second direction from the electrode assembly substantially opposite to the first direction; and
a plurality of insulating gaskets, wherein one of the insulating gaskets is between and contacts the case and the first terminal or the second terminal, respectively,
a first current collecting plate directly contacting the plurality of first electrodes, the first terminal, and one of the insulating gaskets, and
an insulating member being between and contacting the case and the first current collecting plate and being spaced from the first terminal, wherein the first alignment openings are substantially aligned with each other, the second alignment openings are substantially aligned with each other, the third alignment openings are substantially aligned with each other, and the fourth alignment openings are substantially aligned with each other,
wherein the first alignment opening is on a first half of the first uncoated region and the second alignment opening is on a second half of the first uncoated region, and wherein the third alignment opening is on a first half of the second uncoated region and the fourth alignment opening is on a second half of the second uncoated region,
wherein a fastener extends through at least one alignment opening, and
wherein a size of at least one alignment opening differs from a size of others of the alignment openings to provide a space on either side of the fastener extending therethrough.
2. The rechargeable battery of claim 1, wherein the electrode assembly is laminated.

3. The rechargeable battery of claim 1, wherein the first alignment opening, the second alignment opening, the third alignment opening and the fourth alignment opening are substantially circular or substantially ovular.

4. The rechargeable battery of claim 1, wherein a distance between the first alignment opening and the second alignment opening is different from a distance between the third alignment opening and the fourth alignment opening.

\* \* \* \* \*